UNITED STATES PATENT OFFICE.

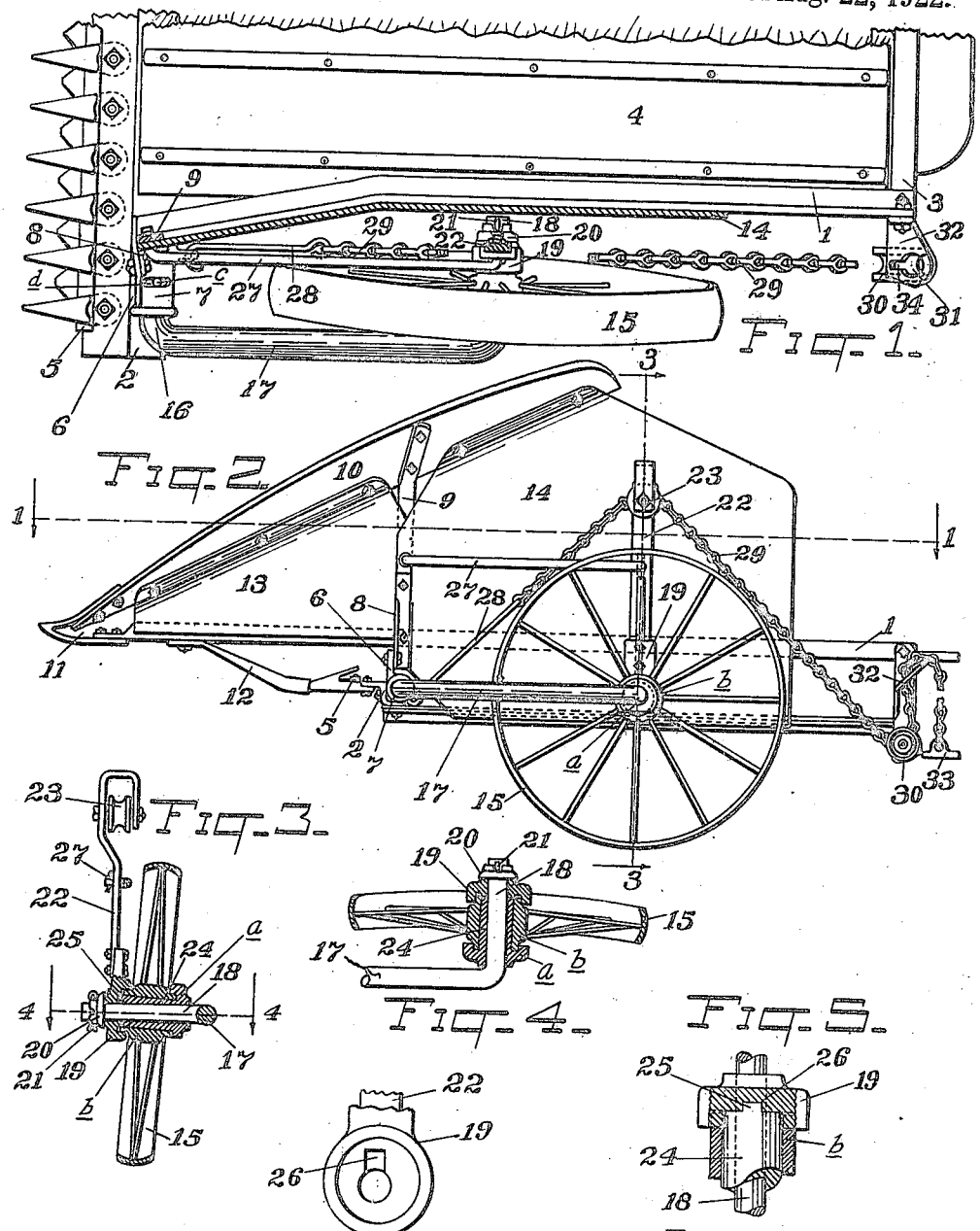

FREDERICK D. WILSON, OF MOLINE, ILLINOIS, ASSIGNOR TO DEERE & COMPANY, OF MOLINE, ILLINOIS, A CORPORATION OF ILLINOIS.

GRAIN WHEEL FOR HARVESTERS.

1,426,937.   Specification of Letters Patent.   Patented Aug. 22, 1922.

Application filed July 19, 1920. Serial No. 397,470.

*To all whom it may concern:*

Be it known that I, FREDERICK D. WILSON, a citizen of the United States, residing at Moline, in the county of Rock Island and State of Illinois, have invented certain new and useful Improvements in Grain Wheels for Harvesters, of which the following is a specification, reference being had therein to the accompanying drawing.

My invention relates to grain wheels commonly employed to support the grainward end of the platform of harvesters and binders which are capable of vertical adjustment.

The object of my invention is to mount such a wheel with both pitch and gather, and to provide means by which the pitch and gather is constant irrespective of the vertical adjustment of the grainward end of the harvester platform.

Referring to the drawings in which similar numerals indicate identical parts—

Figure 1 is a plan view in part of the grainward end of a harvester platform, illustrating, in part section on the line 1—1 of Figure 2 the grainwheel mounting and showing the pitch and gather of the grainwheel.

Figure 2 is a side elevation including the outside divider.

Figure 3 is a sectional detail on the line 3—3 of Figure 2.

Figure 4 is a detail section of the grainwheel and hub taken on the line 4—4 of Figure 3, Figure 5 is an enlarged sectional detail of the wheel hub and eccentric bushing, and Figure 6 is a face view of one of the wheel supporting parts.

The harvester platform frame is of a well known type and includes an upper end bar 1 which extends between the front bar 2 and rear bar 3 of the platform frame and is rigidly secured to both. Upon the platform frame is the conveyor 4, and the cutter bar 5. A bracket 6 is securely bolted to the frame bar 2 and carries, preferably integral therewith, a sleeve 7, horizontally disposed and parallel with the bar 2. Rigidly mounted on the bracket 6 is a support 8 to which is secured a vertical bar 9 supporting the outside divider board 10, the forward end of which is secured in a shoe 11 mounted on the forward end of the bar 1 to which is connected a brace 12 having its inner end supported on a guard finger in the usual manner. Shields 13 and 14 are secured to the divider 10, the frame, and the bar 9.

A horizontally disposed crank axle 17 has a forward spindle 16 journaled in the sleeve 7 and is retained therein by a pin *c* which is attached to the spindle 16 and operates in a slot *d* in the sleeve 7. The crank axle 17 extends rearwardly and has a spindle 18, parallel to the spindle 16, and on which the grainwheel 15 is mounted. A bracket 19 is loosely mounted on the part 18 of the crank axle 17 and is held in place by a washer 20 and a cotter 21. Rigidly bolted to the bracket 19 is a vertical standard 22 having its upper end bent to form a support for a pulley 23. Upon the part 18, of the crank axle 17, is an eccentric bushing 24 which is held against rotation by a lug or projection 25 fitting in a recess 26 in the bracket 19. The grain wheel 15 is mounted to rotate on the bushing 24, and as the latter is eccentric to the part 18 of the crank axle in both a horizontal and vertical plane, the wheel is given a pitch as well as a gather. The outer end of the bushing 24 is provided with a flange *a* fitting over the adjacent end of the grainwheel hub *b*, and the opposite ends of the hub and the bushing are covered by the bracket 19 which is recessed for that purpose. A rod 27 extends parallel to the crank axle 17, and is pivotally connected to the vertical standard 22 and to the vertical bar 9. A link 28 is pivoted to the bracket 6, and to its opposite end is connected a chain 29 which leads over the pulley 23 and then downward beneath a pulley 30, mounted on the rear of the platform frame. From the pulley 30 the chain extends upward through an opening 31 in a bracket 32 on the platform frame, and is provided, at its end, with a hand grip 33, by which the chain 29 can be operated, the opening 31 having a slot 34 extending therefrom in which any one of the links of the chain 29 may be engaged to hold the latter securely.

By means of the mechanism described the grainward end of the harvester platform can be raised by a pulling force exerted on the chain 29, and as the platform rises the crank axle 17 is rocked downwardly, relatively to the platform, the crank axle 17 rocking on its bearing in the sleeve 7. As before stated the eccentric bushing 24 is held against rotation, and its position is maintained throughout any movement of the crank axle 17 by reason of the rod 27 having a parallel movement with the crank axle 17 and consequently holding the standard 22 constantly vertical, and as the eccentric bushing does not rotate the pitch and gather of the grainwheel 15 is constant irrespective of the rocking movement of the crank axle 17.

I have illustrated my invention applied to the grainwheel of a harvester and binder, but I do not limit myself thereto, for it is evident it is adaptable for use with other types of machines where both pitch and gather of the wheels are desirable.

I claim—

1. In a device of the character described, the combination of a frame, a crank axle rockably supported thereon, a wheel on the crank axle, means on said axle to position the wheel with downward pitch and a forward gather, means to rock the axle and raise or lower the frame, and means to retain the pitch and gather of the wheel constant irrespective of the movement of the frame.

2. In a device of the character described, the combination of a frame, a crank axle rockably supported thereon, a wheel on the crank axle, an eccentric non-rotatable bushing mounted on the axle and within the hub of said wheel whereby the wheel is given a constant downward pitch and forward gather, means to rock the axle and raise or lower the frame, and means to retain the pitch and gather of the wheel constant irrespective of the movement of the frame.

3. In a device of the character described, the combination of a frame, a horizontally disposed crank axle rockably supported at one end on the frame, a wheel on the opposite end of the crank axle and having a downward pitch and a forward gather, means to rock said axle and raise or lower the frame, and means to retain the pitch and gather of the wheel constant irrespective of the movement of the frame.

4. In a device of the character described, the combination of a frame, a crank axle horizontally disposed and rockably supported at its forward end on the frame, a standard supported on the opposite end of the axle, means to hold the standard in a vertical position, a wheel supported on the axle adjacent the standard, an eccentric bushing on the axle within the hub of said wheel, whereby the wheel is given a constant downward pitch and forward gather, and means to hold the bushing from rotating.

5. In a device of the character described, the combination of a frame, a horizontally disposed crank axle rockably supported at its forward end on the frame, a standard supported on the opposite end of the axle, means in parallelism with the axle and pivotally supported on the frame and pivotally connected to the standard to hold the standard permanently vertical, a wheel on the crank axle having a constant downward pitch and forward gather, means to rock said axle and raise or lower the frame, and means to retain the pitch and gather of the wheel constant irrespective of the movement of the frame.

6. In a device of the character described, the combination of a frame, a horizontally disposed crank axle rockably supported at its forward end on the frame, a standard supported on the opposite end of the axle, a rod pivotally supported on the frame in parallelism with the axle and pivotally connected to the standard to hold the latter permanently vertical, a wheel on the crank axle having a constant downward pitch and forward gather, means to rock said axle and raise or lower the frame, and means to retain the pitch and gather of the wheel constant irrespective of the movement of the frame.

7. In a device of the character described, the combination of a frame, a crank axle pivotally mounted at one end on the frame, a support for the opposite end of said axle, a wheel journaled on the axle and having a constant downward pitch and forward gather, means to rock said axle to raise or lower the frame, and a rod pivotally supported on the frame and pivotally connected to the wheel support, said rod being of equal length with the axle and parallel therewith.

FREDERICK D. WILSON.